(12) United States Patent
Bharadwaj et al.

(10) Patent No.: US 8,345,617 B2
(45) Date of Patent: Jan. 1, 2013

(54) SENDING AN UPLINK ORDER TO ACTIVE SET BASE STATIONS

(75) Inventors: Arjun Bharadwaj, San Diego, CA (US); Sharad Deepak Sambhwani, San Diego, CA (US); Rohit Kapoor, San Diego, CA (US); Aziz Gholmieh, San Diego, CA (US); Jilei Hou, San Diego, CA (US); Danlu Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 12/861,745

(22) Filed: Aug. 23, 2010

(65) Prior Publication Data
US 2011/0205983 A1 Aug. 25, 2011

Related U.S. Application Data

(60) Provisional application No. 61/236,483, filed on Aug. 24, 2009.

(51) Int. Cl.
*H04W 72/04* (2009.01)
(52) U.S. Cl. ...................................................... 370/329
(58) Field of Classification Search .................... 370/329
See application file for complete search history.

(56) References Cited

U.S. PATENT DOCUMENTS

| 2007/0076641 | A1 | 4/2007 | Bachl et al. | |
|---|---|---|---|---|
| 2007/0109964 | A1* | 5/2007 | Kwak et al. | 370/230 |
| 2007/0223405 | A1* | 9/2007 | Jiang et al. | 370/278 |
| 2008/0080424 | A1* | 4/2008 | Torsner et al. | 370/330 |
| 2008/0165799 | A1* | 7/2008 | Rajendran et al. | 370/465 |
| 2009/0168704 | A1* | 7/2009 | Lee et al. | 370/329 |

FOREIGN PATENT DOCUMENTS

| WO | WO2009132169 | 10/2009 |
|---|---|---|
| WO | WO2010068487 | 6/2010 |

OTHER PUBLICATIONS

3GPP TSG-RAN WG1 Meeting #57bis, R1-092829, "TTI repetition for improved performance in large cells". Nokia Siemens Networks, Nokia, Jun. 29-Jul. 3, 2009.
3GPP TSG-RAN WG1 Meeting #58, R1-093566, "TTI repetition for 2msec TTI coverage enhancement", Nokia Siemens Networks, Nokia, Aug. 24-28, 2009.
3GPP TSG-RAN WG1 Meeting #58, R1-093338, "UL Coverage Extension in 2 ms TTI HSUPA", Alcatei-Lucent, Aug. 24-28, 2009.

(Continued)

*Primary Examiner* — Sulaiman Nooristany
(74) *Attorney, Agent, or Firm* — Larry J. Moskowitz; Darren M. Simon

(57) ABSTRACT

A method for sending an uplink order to active set base stations is disclosed. A new mode of operation for a wireless communication device is determined. A transmission is sent on an uplink control channel to active set base stations that indicates the new mode. The transmission from the wireless communication device is received on the E-DPCCH. It is determined if the transmission is an uplink order. The new mode of operation is transitioned to. Subsequent transmissions from the wireless communication device are interpreted using the new mode of operation if the transmission is an uplink order.

18 Claims, 12 Drawing Sheets

OTHER PUBLICATIONS

3GPP TSG-RAN WG1 Meeting #56bis, R1-091555. "Repetition/TTI length switching design issues", Nokia Siemens Networks, Nokia, Mar. 23-27, 2009.

3GPP TS 25.213 V9.1.0 (Dec. 2009), 3rd Generation Partnership Project:Technical Specification Group Radio Access Network;Spreading and modulation (FDD)(Release 9), pp. 1-38.

3GPP-TS 25.214 V9.2.0 (Mar. 2010), 3rd Generation Partnership Project;Technical Specification Group Radio Access Network; Physical layer procedures (FDD) (Release 9), pp. 1-98.

3GPP TS 25.331 V9.3.0 (Jun. 2010), 3rd Generation Partnership Project;Technical Specification Group Radio Access Network;Radio Resource Control (RRC);Protocol specification (Release 9), pp. 1-1785

3GPP TS 25.321 V9.3.0 (Jun. 2010), 3rd Generation Partnership Project; Technical Specification Group Radio Access Network;Medium Access Control (MAC) protocol specification (Release 9); pp. 1-193.

Huawei : "Dynamic activation and deactivation of secondary carrier f o r DC-HSUPA", 3GPP Draft; R2-093158 Dynamic Activation and Deactivation of Secondary Carrier for DC-HSUPA, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 29, 2009, XP050340875.

International Search Report and Written Opinion—PCT/US2010/046514, International Search Authority—European Patent Office—Nov. 29, 2010.

Nokia Siemens Networks et al: "2msec TTI coverage extension", 3GPP Draft; R2-093071, 3rd Generation Partnership Project (3GPP), Mobile Competence Centre ; 650, Route Des Lucioles ; F-06921 Sophia-Antipolis Cedex ; France, no. San Francisco, USA; 20090427, Apr. 27, 2009, XP050340821.

Nokia Siemens Networks et al: "TTI repetition for improved performance in large cells", 3GPP Draft; RI-092829, 3rd Generation Partnership Project (3GPP), Mobile Competence Centre ; 650, Route Des Lucioles ; F-06921 Sophia-Antipolis Cedex ; France, no. Los Angeles, USA; 20090621, Jun. 24, 2009, XP050351272.

\* cited by examiner

SENDING AN UPLINK ORDER TO ACTIVE SET BASE STATIONS

RELATED APPLICATIONS

This application is related to and claims priority from U.S. Provisional Patent Application Ser. No. 61/236,483 filed Aug. 24, 2009, for "UE Transition into an Enhanced Coverage Mode via E-DPCCH Transmission Orders."

TECHNICAL FIELD

The present disclosure relates generally to electronic devices for communication systems. More specifically, the present disclosure relates to sending an uplink order to active set base stations.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

Devices in a wireless communication network may use various signaling. Among other things, this signaling may be used to synchronize various devices within a wireless communication system. However, during soft handoff, multiple base stations may be affected by changes in the operation of a wireless communication device. Therefore, benefits may be realized by systems and methods for sending an uplink order to active set base stations.

SUMMARY

A method for sending an uplink order to active set base stations is disclosed. A new mode of operation for a wireless communication device is determined. A transmission on an uplink control channel is sent to active set base stations that indicates the new mode. The new mode is transitioned into.

In one configuration, the uplink control channel is an Enhanced Dedicated Physical Control Channel (E-DPCCH). The transmission may include an illegal value for a packet size parameter that indicates that the transmission is an uplink order. The illegal value may be a reserved Enhanced Dedicated Channel (E-DCH) Transport Format Combination Indicator (E-TFCI) codeword that chosen based on which E-TFCI table with which the wireless communication device is configured.

The transmission may be sent one or more subsequent times. For example, the transmission may be sent until an acknowledgment is received from every base station in the active set of the wireless communication device or a fixed number of subsequent transmissions.

The transitioning to the new mode may include switching to a coverage extension (CE) mode. The coverage extension (CE) mode may include transmitting using eight hybrid automatic repeat request (HARQ) processes each with a two millisecond duration. The coverage extension (CE) mode may also include, at a transition boundary, transmitting using four super HARQ processes each with a ten millisecond duration.

Determining a new mode of operation may include averaging an available headroom metric over a period of time and comparing the average to a predetermined threshold to determine if the new mode of operation is needed.

An apparatus for sending an uplink order to active set base stations is also disclosed. The apparatus includes a processor and memory in electronic communication with the processor. Executable instructions are stored in the memory. The instructions are executable to determine a new mode of operation for a wireless communication device. The instructions are also executable to send a transmission on an uplink control channel to active set base stations that indicates the new mode. The instructions are also executable to transition to the new mode of operation.

An apparatus for sending an uplink order to active set base stations is also disclosed. The apparatus includes means for determining a new mode of operation for a wireless communication device. The apparatus also includes means for sending a transmission on an uplink control channel to active set base stations that indicates the new mode. The apparatus also includes means for transitioning to the new mode of operation.

A computer-program product for sending an uplink order to active set base stations is also disclosed. The computer-program product comprises a non-transitory computer-readable medium having instructions thereon. The instructions include code for causing a wireless communication device to determine a new mode of operation for a wireless communication device. The instructions also include code for causing the wireless communication device to send a transmission on an uplink control channel to active set base stations that indicates the new mode. The instructions also include code for causing the wireless communication device to transition to the new mode of operation.

A method for receiving an uplink order on an uplink control channel is also disclosed. A transmission is received from a wireless communication device on an Enhanced Dedicated Physical Control Channel (E-DPCCH). It is determined if the transmission is an uplink order. If the transmission is an uplink order, subsequent transmissions from the wireless communication device are interpreted using a new mode of operation indicated in the uplink order.

In one configuration, determining if the transmission is an uplink order may include detecting an illegal value for a packet size parameter in the transmission that indicates that the transmission is an uplink order. The illegal value may be a reserved Enhanced Dedicated Channel (E-DCH) Transport Format Combination Indicator (E-TFCI) codeword that chosen based on which E-TFCI table with which the wireless communication device is configured.

An acknowledgment message may be sent if the transmission is successfully decoded. An acknowledgement message may not be sent, however, for subsequent transmissions from the wireless communication device that are successfully decoded as the uplink order. The interpreting may include monitoring less, more or different uplink frequency carriers for subsequent transmissions.

An apparatus for receiving an uplink order on an uplink control channel is also disclosed. The apparatus includes a processor and memory in electronic communication with the processor. Executable instructions are stored in the memory.

The instructions are executable to receive a transmission from a wireless communication device on an Enhanced Dedicated Physical Control Channel (E-DPCCH). The instructions are also executable to determine if the transmission is an uplink order. The instructions are also executable to interpret subsequent transmissions from the wireless communication device, if the transmission is an uplink order, using a new mode of operation indicated in the uplink order.

An apparatus for receiving an uplink order on an uplink control channel is also disclosed. The apparatus includes means for receiving a transmission from a wireless communication device on an Enhanced Dedicated Physical Control Channel (E-DPCCH). The apparatus also includes means for determining if the transmission is an uplink order. The apparatus also includes means for interpreting subsequent transmissions from the wireless communication device, if the transmission is an uplink order, using a new mode of operation indicated in the uplink order.

A computer-program product for receiving an uplink order on an uplink control channel is also disclosed. The computer-program product comprises a computer-readable medium having instructions thereon. The instructions include code for causing a base station to receive a transmission from a wireless communication device on an Enhanced Dedicated Physical Control Channel (E-DPCCH). The instructions also include code for causing the base station to determine if the transmission is an uplink order. The instructions also include code for causing the base station to interpret subsequent transmissions from the wireless communication device, if the transmission is an uplink order, using a new mode of operation indicated in the uplink order.

DETAILED DESCRIPTION

In High Speed Downlink Packet Access (HSDPA), the High Speed Shared Control Channel (HS-SCCH) may carry control information from a base station to a wireless communication device. The control information may include packet size, modulation scheme, transmission number, etc. The wireless communication device may then use this control information to decode the actual data on the High Speed Physical Downlink Shared Channel (HS-PDSCH). The HS-SCCH may also carry downlink orders that request the wireless communication device do something specific, e.g., deactivate, change or activate new carriers. During soft handoff, a wireless communication device may be communicating with multiple base stations, each of which may benefit from receiving these downlink orders. However, non-serving base stations may not receive the downlink orders without extra signaling, e.g., the serving base station informs the radio network controller (RNC) that informs the non-serving base station about the downlink order. The extra signaling may introduce delay and suffer from interference. Additionally, the wireless communication device may not be able to take advantage of macro diversity during this period.

Sometimes a wireless communication device may wish to send an order on an uplink control channel, e.g., the Enhanced Dedicated Physical Control Channel (E-DPCCH). Although it generally carries different information than the HS-SCCH, the E-DPCCH may be used to send uplink orders similar the downlink orders on the HS-SCCH. One particular advantage of the E-DPCCH order is to relay a downlink order to non-serving cells since the non-serving cells are not privy to the HS-SCCH order. The non-serving cells may benefit even though they may not need to act on them since the order is not meant for them.

Therefore, the present systems and methods enable an uplink order to be sent from a wireless communication device to the base stations in its active set. This may allow the wireless communication device to initiate communication with all active set base stations regarding various changes, e.g., reducing uplink carriers, changing uplink carriers, adding uplink carriers, transitioning to or from coverage extension (CE) mode, relaying a downlink order to non-serving base stations, etc. These uplink orders introduce little latency and may be received by both serving and non-serving base stations at around the same time.

Figure 1:
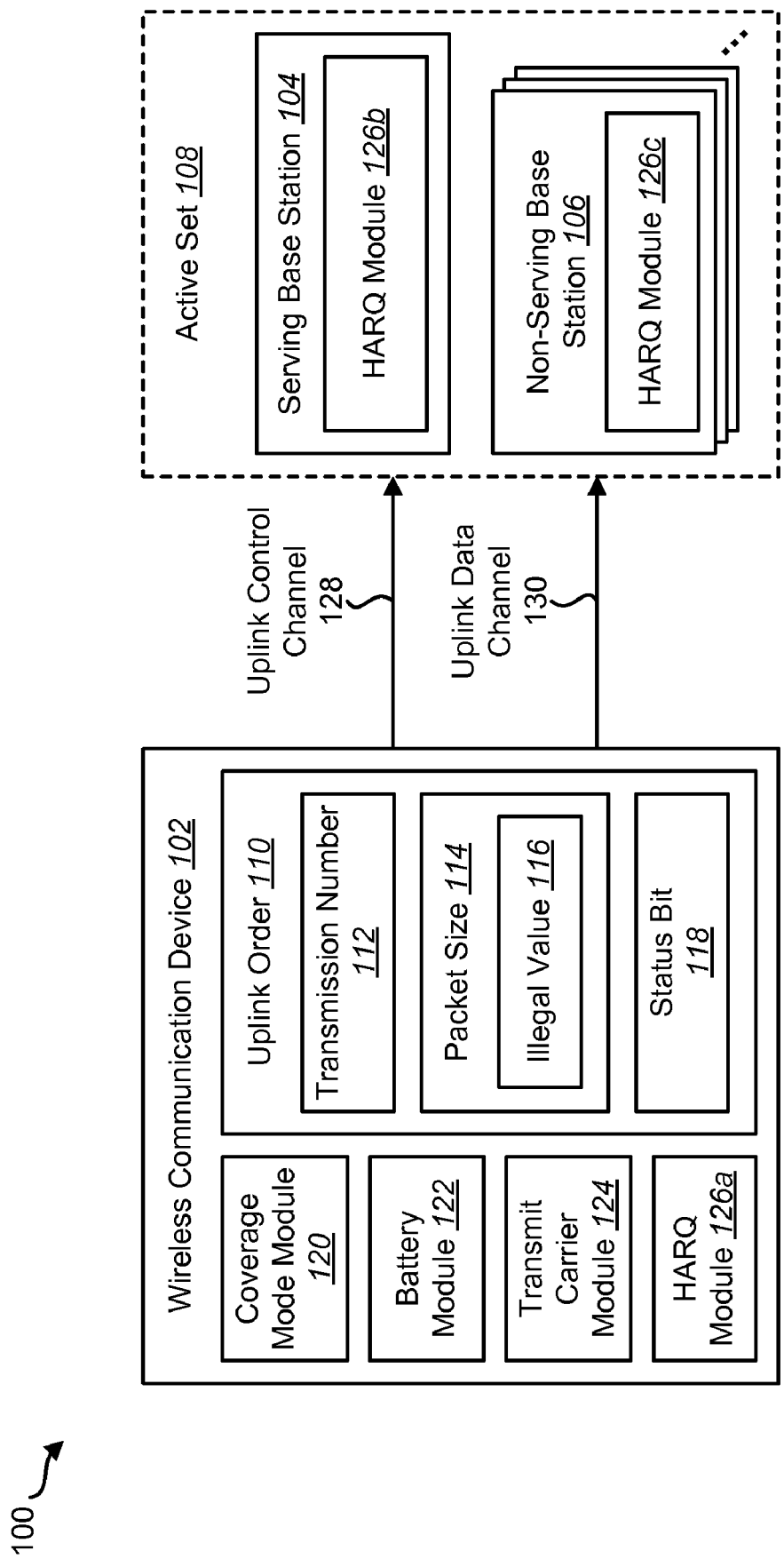
FIG. 1 is a block diagram illustrating a system for sending an uplink order to active set base stations.

FIG. 1 is a block diagram illustrating a system 100 for sending an uplink order 100 to active set base stations 104, 106. The system 100 may include a wireless communication device 102 that communicates with a serving base station 104. However, during soft handoff, the wireless communication device 102 may also communicate with one or more non-serving base stations 106.

In HSPA, the serving base station 104 is the base station that transmits downlink HS-PDSCH data to the wireless communication device 102. This is specific to HS data. DPDCH data may be transmitted on the downlink from both serving base stations 104 and non-serving base stations 106. The serving base station 104 may also have other properties, e.g., the acknowledgment message (ACK) for the downlink data is transmitted on the HS-DPCCH channel which is received only by the serving base station 104. Furthermore, the channel quality information (CQI) is transmitted only to the serving base station 104 and is based on pilot channel measurements made from the downlink pilot on the serving base station 104. Mobility is also based on the serving base station 104 signal strength—etc.

The serving base station 104 and non-serving base station(s) 106 may collectively form the active set 108 of the wireless communication device 102, i.e., the set of base stations with which the wireless communication device 102 is currently communicating. The base stations 104, 106 may communicate with other devices directly or indirectly, e.g., base station controller (also referred to as a radio network controller or packet control function), a mobile switching center (MSC), a packet data serving node (PDSN) or internetworking function (IWF), a public switched telephone network (PSTN) (typically a telephone company) or an Internet Protocol (IP) network 118, e.g., typically the Internet.

As used herein, the term "wireless communication device" refers to an electronic device that may be used for voice and/or data communication over a wireless communication system. Examples of wireless communication devices include cellular phones, personal digital assistants (PDAs), handheld devices, wireless modems, laptop computers, personal computers, etc. A wireless communication device may alternatively be referred to as an access terminal, a mobile terminal, a mobile station, a remote station, a user terminal, a terminal, a subscriber unit, a subscriber station, a mobile device, a wireless device, user equipment (UE) or some other similar terminology. The term "base station" refers to a wireless communication station that is installed at a fixed location and used to communicate with wireless communication devices. A base station may alternatively be referred to as an access point, a Node B, an evolved Node B or some other similar terminology.

At times, the wireless communication device 102 may change its mode of operation. For example, the wireless communication device 102 may switch to a coverage extension (CE) mode, disable an uplink carrier, change an uplink carrier, add an uplink carrier, notify a base station 104, 106 that it is low on battery, etc. Therefore, an uplink order 110 may be used by the wireless communication device 102 to inform base stations 104, 106 in the active set 108 of changes or desired changes. The uplink order 110 may be sent on an uplink control channel 128. For example, the uplink control channel 128 may be the Enhanced Dedicated Physical Control Channel (E-DPCCH) in a High-Speed Downlink Packet Access (HSPA) system 100, i.e., the uplink channel used to carry control information for the Enhanced Dedicated Physical Control Channel (E-DCH) in High-Speed Uplink Packet Access (HSUPA).

In one configuration, the uplink control channel 128 may be used to carry control information that may be used by base stations 104, 106 to decode data on an uplink data channel 130, e.g., the Enhanced Dedicated Physical Data Channel (E-DPDCH) in an HSPA system 100. For example, uplink control information may include an indication of the packet size, modulation type or transmission number of associated data on the uplink data channel 130. However, when the uplink control channel 128 is used to transmit an uplink order 110 (instead of uplink control information), the uplink data channel 130 may not transmit data. The uplink order 110 may be received by all base stations 104, 106 in the active set 108 because it is sent on the uplink control channel 128. This may be more efficient than notifying the serving base station 104 and having the serving base station 104 signal to the non-serving base stations 106, e.g., through a radio network controller (RNC).

The uplink order 110 may include a transmission number 112, a packet size 114 and a status bit 118. In one configuration, the transmission number 112, when transmitting control information, may be two bits that indicate the re-transmission number of the payload on the uplink data channel 130, e.g., the Retransmission Sequence Number (RSN). However, when the uplink control channel 128 is used to transmit an uplink order 110 (instead of uplink control information), the transmission number 112 bits may indicate the type of uplink order 110. For example, each of four possible bit combinations (using the two transmission number 112 bits) may indicate different uplink order 110 types, e.g., switch to coverage extension (CE) mode, switch from coverage extension (CE) mode, disabling a carrier, enabling a carrier, etc. The packet size 114, when transmitting control information, may be seven bits that indicate the packet size of the payload on the uplink data channel 130, e.g., the Transport Block Size (TBS). However, when the uplink control channel 128 is used to transmit an uplink order 110, the packet size 114 may include an illegal value 116 that indicates that the uplink transmission is an uplink order 110. For example, the illegal value 116 may be 7 bits that indicate a reserved packet size 114 that should not be used for normal data sent on the uplink data channel 130. The status bit 118, when transmitting control information, may be a single bit that indicates whether the wireless communication device 102 desires a change to its current Serving Grant, e.g., a happy bit. However, in one configuration, when the uplink control channel 128 is used to transmit an uplink order 110, the status bit 118 may be combined with the transmission number 112 bits. For example, the two transmission number 112 bits and a single status bit 118 may provide three bits to indicate one of 8 different order types, each indicating a specific functionality.

Order types may be indicated with a variety of different ways. For example, type "00" or "000" may indicate entry into coverage extension (CE) mode and "01" or "001" for exit. Once an order type is used for a specific functionality in a particular release of HSPA or LTE, (e.g., Release 10) the order type may not be reused for a different functionality in the same release. However, it could be re-defined in a later release.

The wireless communication device 102 may determine to send an uplink order 110 (instead of control information) for various reasons. For example, a coverage mode module 120 may determine that the wireless communication device 102 has limited available uplink power headroom (UPH), i.e., the wireless communication device 102 is almost transmitting at maximum power. Thus, an uplink order 110 may be sent that indicates a switch to coverage extension (CE) mode. Conversely, an uplink order 110 may also be sent from a wireless communication device 102 that is transitioning out of coverage extension (CE) mode. Alternatively, a battery module 122 may determine that the wireless communication device 102 is running low on battery. In response, an uplink order 110 may be sent indicating a modification in operation of the wireless communication device. Alternatively, a transmit carrier module 124 may determine that less, more or different uplink or downlink frequency carriers should be used on the uplink. Therefore, an uplink order 110 may be sent that indicates this change. Alternatively, the uplink order 110 may be sent to synchronize a non-serving base station 106 with the wireless communication device 102, e.g., the non-serving base station 106 may lose synchronization with the wireless communication device 102 after an HS-SCCH order. Alternatively, the uplink order 110 may indicate that the wireless communication device is deactivating carriers to conserve battery or switch to a mode where it receives data only sporadically.

In implementation, the uplink order 110 may be used for many purposes. For example, an uplink order 110 may signal that MIMO operation in HSPA is disabled for a period of time by the UE. There could be uplink orders 110 to turn MIMO off and on. Alternatively, the uplink order 110 may be used to indicate one of multiple available MIMO modes will be used, i.e., single stream (TxAA), dual stream, precoder weight restricted mode etc. There are also suggestions for new modes of operation like TDM MIMO being developed. Therefore, E-DPCCH orders 110 may be used to inform the serving cell when the UE wishes to transition to a particular MIMO mode. Alternatively, the wireless communication device 102 may choose to deactivate downlink carriers in a different frequency band of operation to save battery life if there isn't much data traffic on the downlink. E-DPCCH orders 110 may be used to indicate this deactivation of downlink carriers. Alternatively, uplink orders 110 may indicate that uplink transmit diversity (ULTD) in HSPA will be used. ULTD— either open loop or closed loop provides gains only in specific scenarios. These scenarios may be best identified by the wireless communication device 102. Therefore, E-DPCCH orders 110 may used to inform the network that the wireless communication device 102 is turning on or off ULTD. Alternatively, E-DPCCH orders 110 may be used to indicate mobility events to the network similar to events 1-6 that are defined in 3GPP.

In one configuration, an uplink order 110 may be sent multiple times to increase the probability that all the base stations 104, 106 in the active set 108 correctly receive it. Therefore, the wireless communication module 102, the serving base station 104 and the non-serving base stations 106 may include hybrid automatic repeat request (HARQ) modules 126a-c. The HARQ modules 126a-c may allow the base stations 104, 106 to acknowledge the reception of, among other transmissions, the uplink orders 110. This may allow the wireless communication device 102 to re-transmit the uplink orders 110 until the entire active set 108 has acknowledged receipt. Alternatively, the uplink orders 110 may be re-transmitted a fixed number of times.

Figure 2:
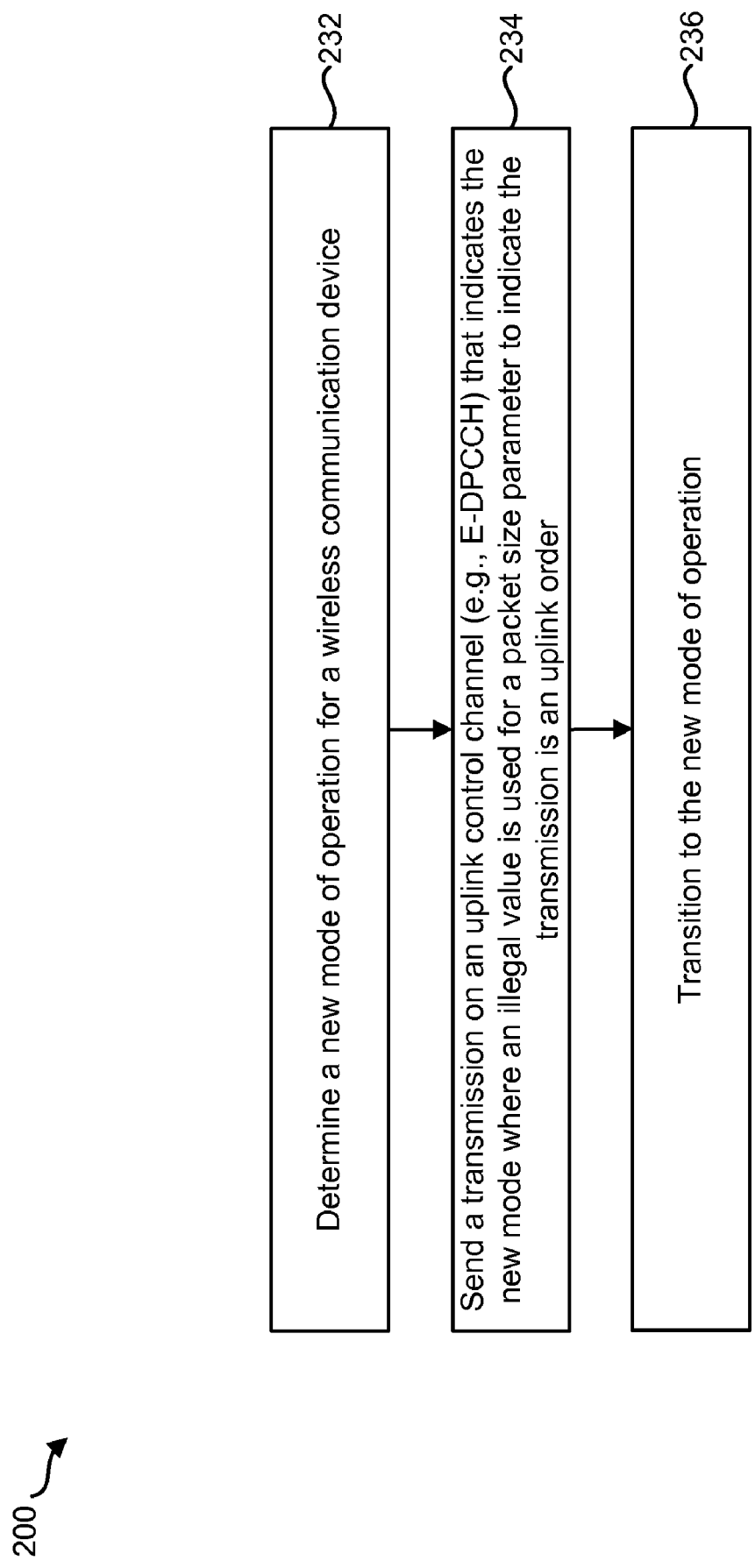
FIG. 2 is a flow diagram illustrating a method for sending an uplink order to active set base stations.

Although particularly useful in soft handoff (i.e., to communicate orders to non-serving base stations 106), the present systems and methods may also be useful when the wireless communication device 102 is not in soft handoff. Even when there is a single serving base station 104 in the active set 108, the uplink order 110 may signal a mode change or inform the network about a situation or status. FIG. 2 is a flow diagram illustrating a method 200 for sending an uplink order 110 to active set base stations 104, 106. The method 200 may be performed by a wireless communication device 102. The wireless communication device 102 may determine 232 a new mode of operation. This may include determining a change to or from a coverage extension (CE) mode, determining a low battery level or adding, changing, or reducing uplink carriers. The wireless communication device 102 may also send 234 a transmission on an uplink control channel (e.g., E-DPCCH) 128 that indicates the new mode. An illegal value 116 may be used for a packet size parameter (e.g., TBS) to indicate that the transmission is an uplink order 110. This uplink order 110 may be transmitted multiple times, e.g., based on the acknowledgments (ACK) or non-acknowledgments (NACK) received from base stations 104, 106 in the active set 108 or a fixed number of times. The wireless communication device 102 may transition 236 to the new mode of operation. This may include, at a transition boundary (e.g., a HARQ cycle boundary), beginning to transmit using coverage extension (CE) mode.

Figure 3:
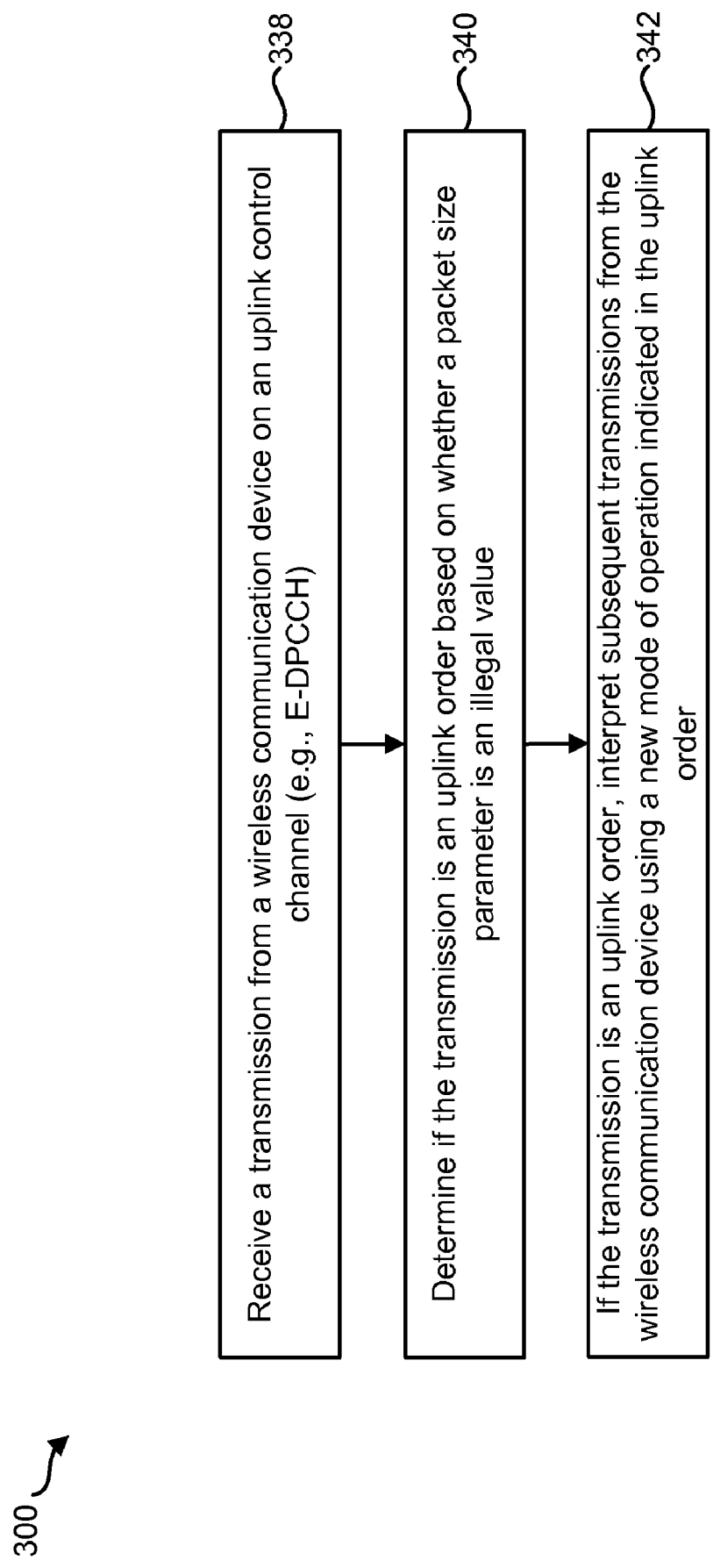
FIG. 3 is a flow diagram illustrating a method for receiving an uplink order on an uplink control channel, e.g., E-DPCCH.

FIG. 3 is a flow diagram illustrating a method 300 for receiving an uplink order 110 on an uplink control channel, e.g., E-DPCCH. The method 300 may be performed by a serving base station 104 or a non-serving base station 106 in the active set 108 of a wireless communication device 102, i.e., currently communicating with the wireless communication device 102. The base station 104, 106 may receive 338 a transmission from a wireless communication device 102 on an uplink control channel 128, e.g., E-DPCCH. The base station 104, 106 may also determine 340 if the transmission is an uplink order 110. This may include determining 340 whether a packet size parameter 114 is an illegal value 116, i.e., a reserved packet size 114 that should not be used for normal data sent on the uplink data channel 130. For example, the illegal value 116 may be one of the reserved E-DCH Transport Format Combination Indicator (E-TFCI) codewords. The base stations 104, 106 may then interpret these codewords as a mode transition signal. As specified in 3GPP TS 25.321, the reserved codewords may be E-TFCI 120 if the wireless communication device 102 is configured with E-TFCI table 0, E-TFCI 115 if configured with E-TFCI table 1, E-TFCI 121 if configured with E-TFCI table 2 or E-TFCIs 101 or 102 if configured with E-TFCI table 3.

If the transmission is an uplink order 110, the base station 104, 106 may interpret 342 subsequent transmissions from the wireless communication device 102 using a new mode of operation indicated in the uplink order 110. For example, the base station 104, 106 may monitor more, different or less uplink carriers based on the uplink order 110. Alternatively, the base station 104, 106 may interpret time transmission intervals (TTIs) differently according to a wireless communication device entering or leaving coverage extension (CE) mode.

Figure 4:
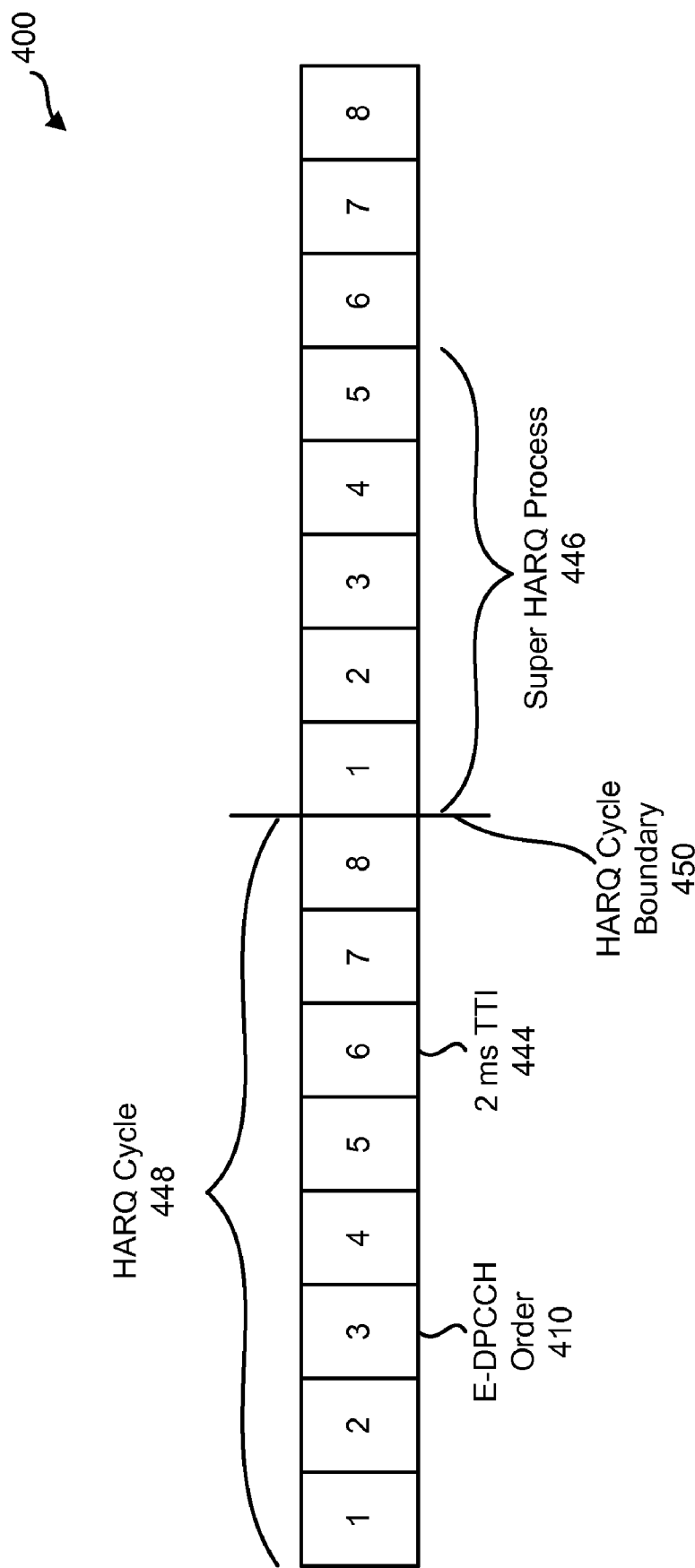
FIG. 4 is a block diagram illustrating a timeline for sending an uplink order.

FIG. 4 is a block diagram illustrating a timeline 400 for sending an uplink order 410. More specifically, the timeline 400 may illustrate uplink transmissions on the E-DPCCH from a wireless communication device 102 before and after a transition to coverage extension (CE) mode. A wireless communication device 102 may dynamically switch between 2 ms TTI 444 operation and the coverage extension (CE) mode. One possible way to signal transition into coverage extension (CE) mode is for active set base stations 104, 106 to detect changes in the E-DPCCH power levels. However, this may use high changes in the relative power levels for robust operation. Instead, the available bits in the E-DPCCH may signal this transition.

In the timeline 400, each numbered block represents a 2 ms TTI 444. The numbering of the TTIs 444 may indicate HARQ process numbers, i.e., the timeline 400 may be divided into HARQ cycles 448, each with eight HARQ processes. Using HARQ, a wireless communication device 102 may transmit control information, data or uplink orders 410 and wait for an ACK or a NACK before transmitting again. If an ACK is received, subsequent data may be transmitted. If a NACK is received the same data may be re-transmitted. However, waiting for the ACK/NACK may be inefficient. Therefore, multiple HARQ processes may be performed in parallel, i.e., subsequent data may be transmitted while waiting for the ACK/NACK relating to a previous HARQ process.

As mentioned earlier, the wireless communication device 102 may enter the coverage extension (CE) mode when it becomes headroom limited and may exit the coverage extension (CE) mode when the headroom becomes available. At the mode switch boundary (e.g., the HARQ cycle boundary 450), ongoing transmissions may be mapped to super HARQ processes 446 in the new mode. This may increase complexity at the wireless communication device 102. Alternatively, the wireless communication device 102 may wait until all the ongoing transmissions and re-transmissions finish before signalling a mode transition. This may be a simpler approach to the transition operation but may suffer from additional latency.

In one configuration, each HARQ cycle 448 may be 16 ms long (eight HARQ processes of 2 ms each). A wireless communication device 102 may be transmitting using 2 ms TTIs 444 and may desire to transition to a coverage extension (CE) mode using super HARQ processes 446 that are 10 ms long. In other words, coverage extension (CE) mode may include super HARQ processes 446 that are longer in duration than HARQ processes. The mapping from HARQ processes to super HARQ processes 446 may be done in a deterministic way. Furthermore, instead of a HARQ cycle 448 including eight HARQ processes, a super HARQ cycle may include fewer super HARQ processes 446. If more than four HARQ processes are ongoing prior to mode transition, some additional delay may be incurred, i.e., the E-DPCCH order(s) 410 may not be sent until the number of ongoing transmissions is less than or equal to four.

On the other hand, a wireless communication device 102 may transition from coverage extension (CE) mode. The mapping from super HARQ processes 446 to HARQ processes may be performed in a deterministic way. Since there are eight available HARQ processes, no additional delay may be incurred when transitioning from coverage extension (CE) mode.

To indicate a transition into coverage extension (CE) mode, a wireless communication device 102 may send an E-DPCCH order 410 to a base station 104, 106. The E-DPCCH order 410 may indicate that the mode transition will occur at the HARQ cycle boundary 450. Alternatively, the mode transition may occur at a different time that is previously known to the base station 104, 106, e.g., a fixed number of HARQ processes after the E-DPCCH order 410 is sent or at a time determined by a network entity, such as a radio network controller. After the transition to coverage extension (CE) mode, the wireless communication device 102 may transmit on the uplink using four different 10 ms super HARQ processes 446, although different lengths and numbers of super HARQ processes 446 may be used.

Figure 5:
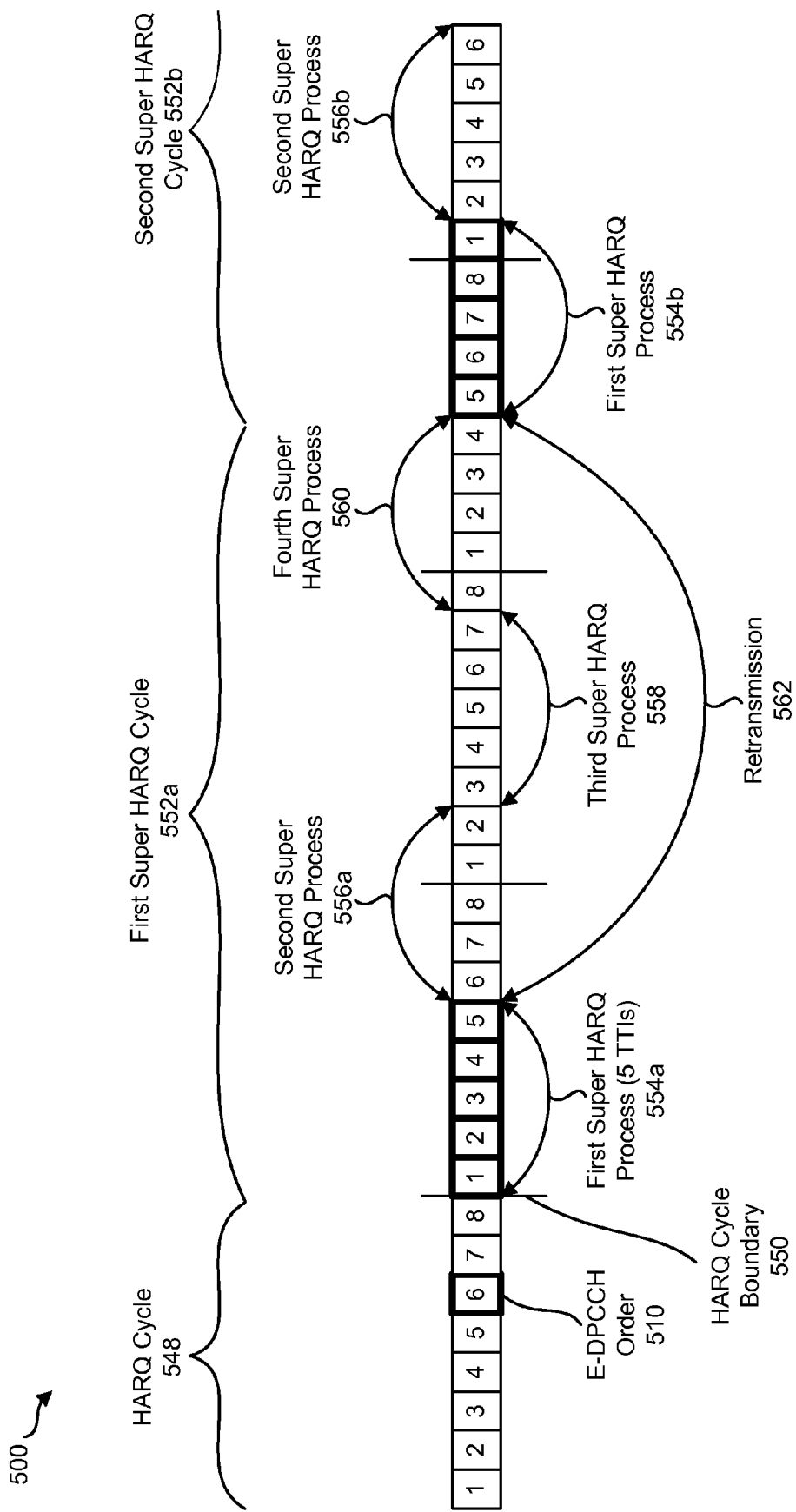
FIG. 5 is a block diagram illustrating another timeline for sending an uplink order.

FIG. 5 is a block diagram illustrating another timeline 500 for sending an uplink order 510. More specifically, the timeline 500 may illustrate uplink transmissions on the E-DPCCH from a wireless communication device 102 before and after a transition to coverage extension (CE) mode. A wireless communication device 102 may transition to coverage extension (CE) mode when it becomes headroom limited. These situations may arise at the cell edge with multiple cells in the active set 108. Therefore, the wireless communication device 102 may be in soft handover with one or more non-serving base stations 106 when transitioning to coverage extension (CE) mode. It may be desirable for all the base stations 104, 106 in the active set 108 to receive the uplink order 510. Therefore, the E-DPCCH order 510 may be sent prior to the mode transition boundary.

Since mode transitions occur after a HARQ cycle boundary 550 (i.e., after the end of an 8 HARQ process cycle 548), the E-DPCCH order 510 that communicates the mode switch may be sent prior to that boundary 550. Additionally, since the purpose of this order 510 is to indicate the mode transition, there is no requirement for an E-DPDCH channel to be transmitted along with the E-DPCCH, i.e., there is no associated data for the uplink data channel 130. The power that would have been used up by the E-DPDCH channel may, therefore, be allocated to the E-DPCCH channel allowing for more robustness in the signalling process. Furthermore, the successful reception of the E-DPCCH order 510 may be acknowledged with an ACK or NACK on the downlink from the base stations 104, 106 that are in the active set 108.

The E-DPCCH order 510 indicates a mode transition to a coverage extension (CE) mode after the HARQ cycle boundary 550. Once in the coverage extension (CE) mode, the 2 ms HARQ processes may be replaced with 10 ms super HARQ processes 554*a-b*, 556*a-b*, 558, 560, i.e., the 2 ms TTI is repeated 5 times in each super HARQ process 554*a-b*, 556*a-b*, 558, 560 with 1 retransmission 562. In other words, first data is transmitted in five consecutive 2 ms TTIs during the first super HARQ process 554*a* in the first super HARQ cycle 552*a*. Second data may then be transmitted during the second super HARQ process 556, third data during the third super HARQ process 558 and fourth data during the fourth super HARQ process 560, i.e., while the wireless communication device 102 waits for an ACK or NACK regarding the first super HARQ process 554*a*. Then, during first super HARQ process 554*b* of the second super HARQ cycle 552*b*, the wireless communication device 102 may transmit the first data again or fifth data, depending on the ACK/NACK received for the first data. Likewise, the second super HARQ process 556*b* in the second super HARQ cycle 552*b* may transmit second data or new data, depending on the ACK/NACK received for the second data. Third data or new data may be transmitted on the third super HARQ process (not shown) and fourth data or new data may be transmitted on the fourth super HARQ process (not shown), depending on the ACK/NACK received for the third and fourth data, respectively. Alternatively, a single retransmission may occur for each super HARQ process 554*a-b*, 556*a-b*, 558, 560, i.e., the super HARQ processes 554*b*, 556*b* in the second super HARQ cycle 552*b* may always re-send the same data as the corresponding super HARQ processes 554*a*, 556*a*, 558, 560 in the first super HARQ cycle 552*a* regardless of the ACK/NACKs received for the first super HARQ cycle 552*a* transmissions.

This scheme is similar to the timing of 10 ms TTI operation. There are 4 Super HARQ processes 554*a-b*, 556*a-b*, 558, 560 in each super HARQ cycle 552*a-b*, as in 10 ms TTI operation. Therefore, the latency and coverage performance of coverage extension (CE) mode is close to that of 10 ms TTI. Specifically, coverage may be improved to within 0.5 dB of 10 ms TTI operation using the coverage extension (CE) mode.

Figure 6:
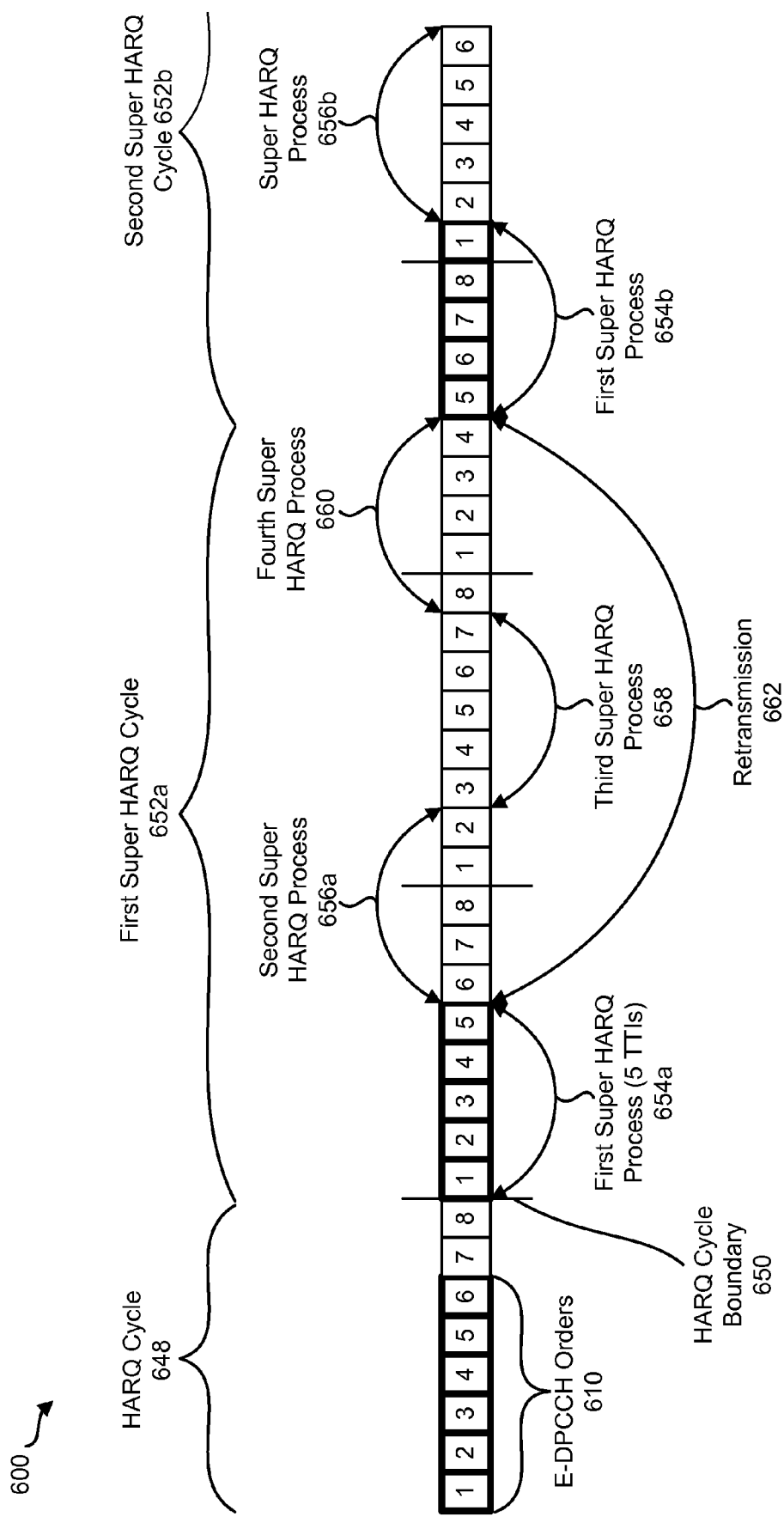
FIG. 6 is a block diagram illustrating another timeline for sending an uplink order.

FIG. 6 is a block diagram illustrating another timeline 600 for sending an uplink order 610. As before, the timeline 600 may illustrate transmissions on the E-DPCCH from a wireless communication device 102 that desires to transition to coverage extension (CE) mode. This may include transitioning from HARQ cycles 648 that include eight HARQ processes to super HARQ cycles 652*a-b* that include four super HARQ processes 654*a-b*, 656*a-b*, 658, 660. Each super HARQ process 654*a-b*, 656*a-b*, 658, 660 may transmit a 2 ms TTI five times, i.e., the same data is transmitted in five consecutive 2 ms TTIs during in a super HARQ process 654*a-b*, 656*a-b*, 658, 660.

In contrast to the E-DPCCH order 510 illustrated in FIG. 5, however, the E-DPCCH order 610 may be transmitted multiple times prior to the HARQ cycle boundary 650 to ensure that ACKs or NACKs are received from all the base stations 104, 106 in the active set 108. In other words, the wireless communication device 102 may transmit E-DPCCH orders 610 until ACKs are received from all non-serving base stations 106. The repetitions of the E-DPCCH order 610 may not be consecutive. The order 610 may be re-transmitted in any available HARQ process prior to the HARQ cycle boundary 650. If a base station 104, 106 has already decoded an order 610, subsequent orders 610 may be ignored.

For example, suppose that an uplink order 610 is repeated n times in an additive white Gaussian noise (AWGN) channel. The probability of proper reception by all active set base stations may be given according to Equation (1):

$$P_{tar} = P_e^n \tag{1}$$

where $P_{tar}$ is the target probability of misdetection or decoding error of the E-DPCCH orders (i.e., a total probability after all re-transmissions are complete), and Pe is the probability of misdetection or decoding error of the E-DPCCH orders for a single order transmission and n is the number of E-DPCCH order transmissions. Thus, if $P_{target}=0.05$ and Pe=0.2, then n=3.

Additionally, if more than two transmissions of the order 610 are sent, the mode switch may be delayed by 16 ms, or 8 HARQ processes, to account for the ACK timeline, i.e., the mode switch may occur one HARQ cycle 648 later than scheduled. This may be done dynamically by the wireless communication device 102 by only beginning transmissions in coverage extension (CE) mode when ACKs from all the base stations 104, 106 in the active set 108 have been received.

Figure 7:
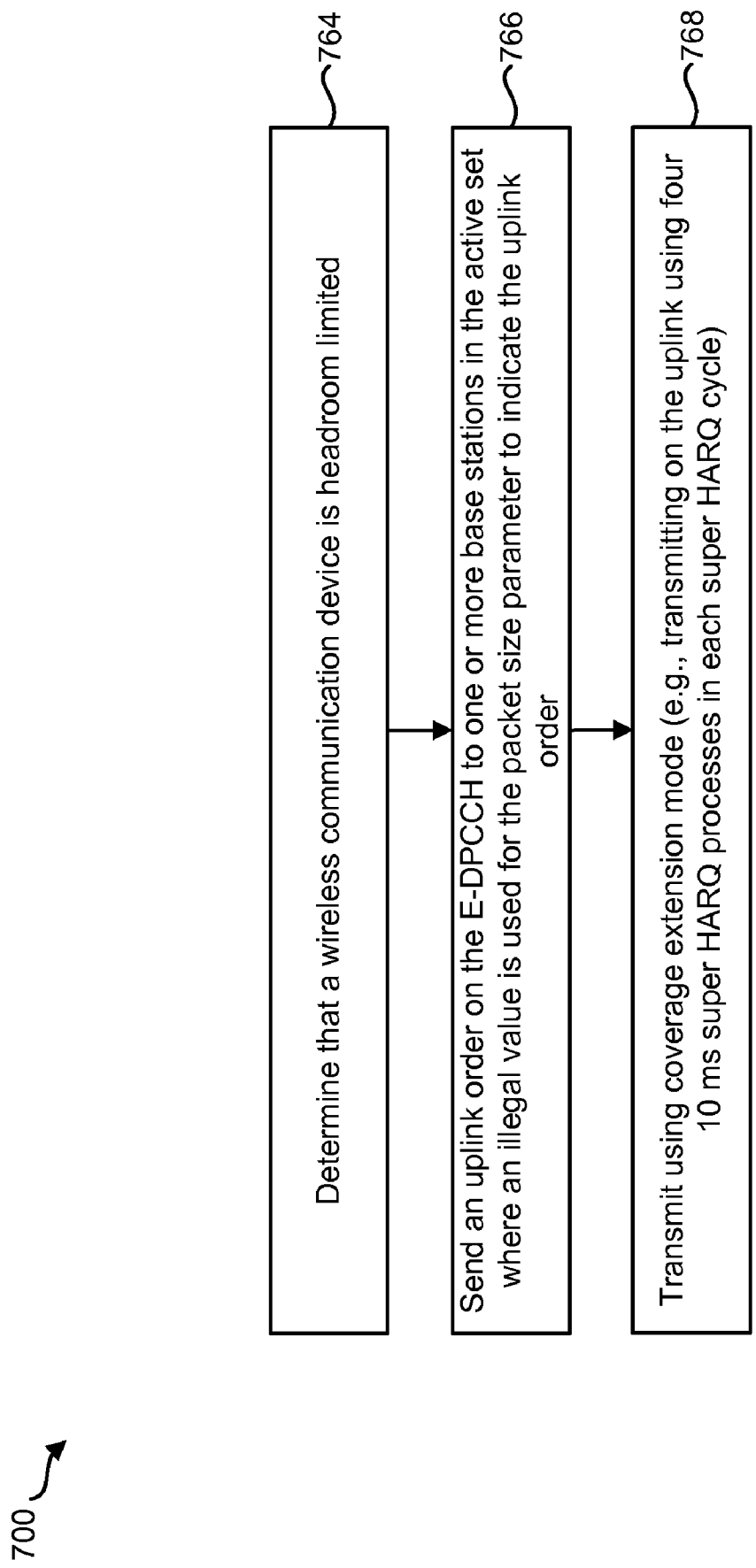
FIG. 7 is a flow diagram of a method for transitioning to a coverage extension (CE) mode.

FIG. 7 is a flow diagram of a method 700 for transitioning to a coverage extension (CE) mode. The method 700 may be performed by a wireless communication device 102. The wireless communication device 102 may determine 764 that it is headroom limited. For example, the available uplink power headroom (UPH) may be compared to a predetermined threshold to determine 764 that the wireless communication device 102 is headroom limited. In one configuration, the available headroom may be averaged over a period of time to determine whether to transition to coverage extension (CE) mode, e.g., 4 ms, 6 ms, 8 ms, 10 ms, 20 ms, etc. The wireless communication device 102 may also send 766 an uplink order 110 on the E-DPCCH to one or more base stations 104, 106 in the active set 108. The uplink order 110 may use an illegal value 116 for the packet size parameter 114 to indicate the transmission is an uplink order 110. The uplink order 110 may also be transmitted 766 multiple times, e.g., until ACKs are received from all active set base stations 104, 106 or a fixed number of times. The wireless communication device 102 may also transmit 768 using coverage extension (CE) mode, e.g., transmitting on the uplink using four 10 ms super HARQ processes 554*a-b*, 556*a-b*, 558, 560 in each super HARQ cycle 552*a-b* illustrated in FIG. 5.

Figure 8:
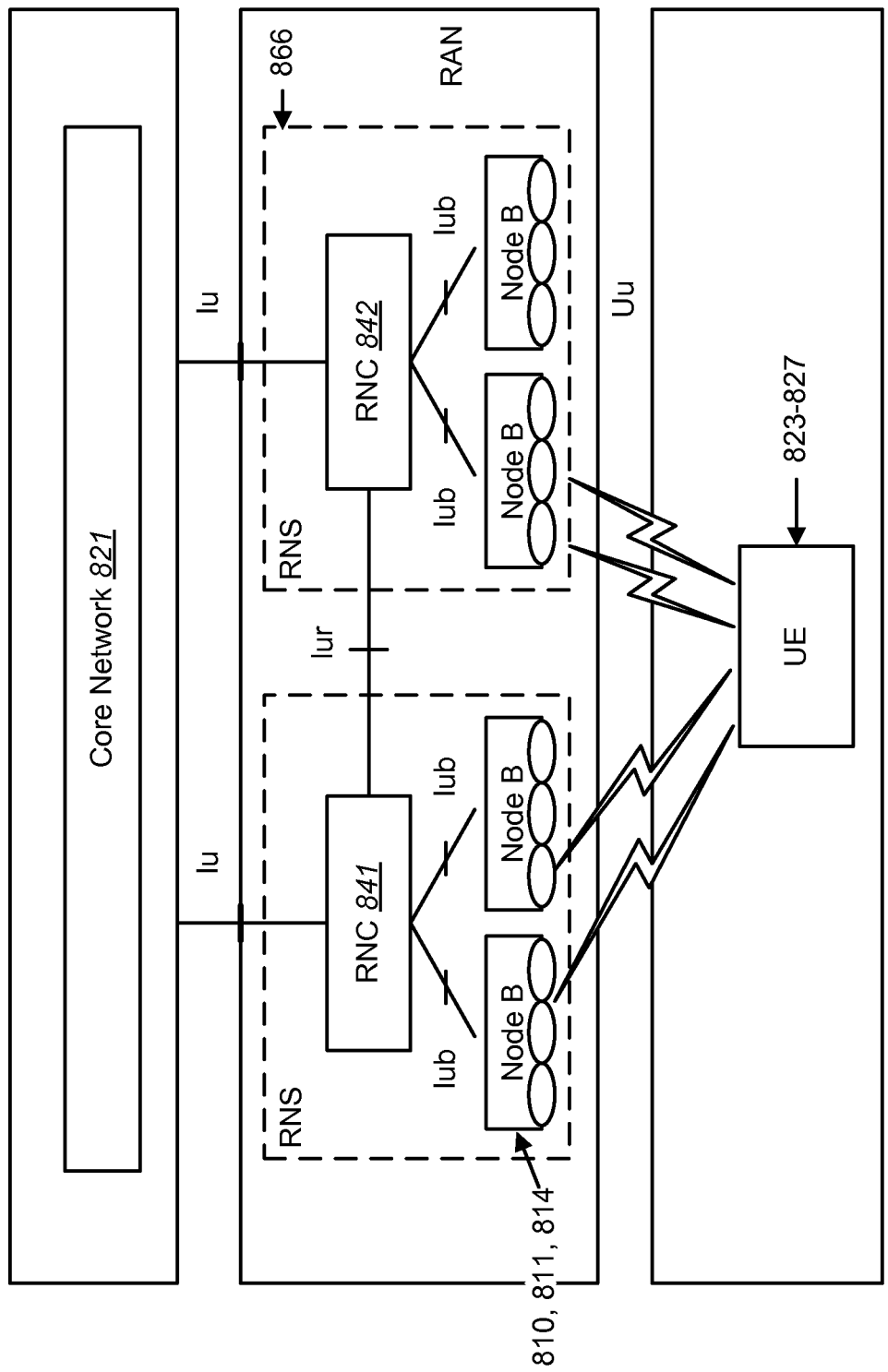
FIG. 8 is a block diagram illustrating a radio network operating according to the Universal Mobile Telecommunications System (UMTS) in which the principles of the disclosure may be applied.

FIG. 8 is a block diagram illustrating a radio network operating according to the Universal Mobile Telecommunications System (UMTS) in which the principles of the disclosure may be applied. Node Bs 810, 811, 814 and radio network controllers 841-842 are parts of a network called a "radio network," "RN," "access network (AN)." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3G communications network which can carry both real-time circuit switched and IP-based packet-switched traffic types. The UTRAN provides an air interface access method for the user equipment (UE) 823-827. Connectivity is provided between the UE (user equipment) 823-827 and the core network 821 by the UTRAN. The radio network may transport data packets between multiple user equipment devices 823-827.

The UTRAN is connected internally or externally to other functional entities by four interfaces: Iu, Uu, Iub and Iur. The UTRAN is attached to a GSM core network 821 via an external interface called Iu. Radio network controllers (RNC) 841, 842 support this interface. In addition, the RNCs 841-842 manage a set of base stations called Node Bs through interfaces labeled Iub. The Iur interface connects the two RNCs 841, 842 with each other. The UTRAN is largely autonomous from the core network 821 since the RNCs 841, 842 are interconnected by the Iur interface. FIG. 8 discloses a communication system that uses RNCs, Node Bs and the Iu and Uu interfaces. The Uu is also external and connects the Node Bs 810, 811, 814 with the UE 823-827, while the Iub is an internal interface connecting the RNCs 841, 842 with the Node Bs 810, 811, 814.

The radio network may be further connected to additional networks outside the radio network, such as a corporate intranet, the Internet, or a conventional public switched telephone network as stated above, and may transport data packets between each user equipment device 823-827 and such outside networks.

Figure 9:
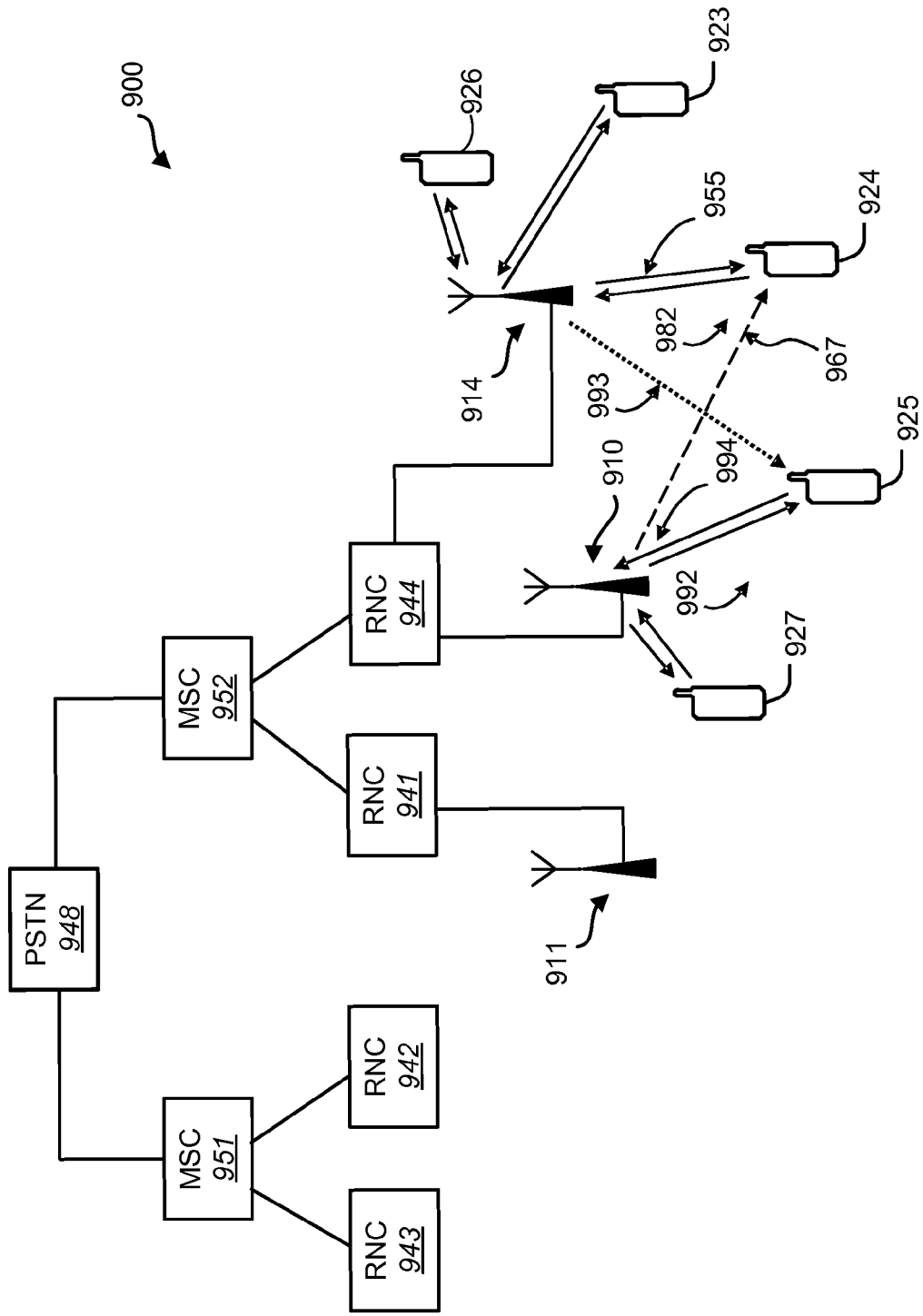
FIG. 9 illustrates selected components of a communication network.

FIG. 9 illustrates selected components of a communication network 900. The network 900 may include radio network controller (RNC) (or base station controllers (BSC)) 941-944 coupled to Node Bs (or base stations or wireless base transceiver stations) 910, 911, and 914. The Node Bs 910, 911, 914 communicate with user equipment (or remote stations) 923-927 through corresponding wireless connections 955, 967, 982, 992, 993, 994. A communications channel includes a forward link (FL) (also known as a downlink) for transmissions from the Node B 910, 911, 914 to the user equipment (UE) 123-127, and a reverse link (RL) (also known as an uplink) for transmissions from the UE 923-927 to the Node B 910, 911, 914. The RNCs 941-944 provides control functionalities for one or more Node Bs 910, 911, 914. The radio network controllers 941-944 are coupled to a public switched telephone network (PSTN) 948 through mobile switching centers (MSC) 951, 952. In another example, the radio network controllers 941-944 are coupled to a packet switched network (PSN) (not shown) through a packet data server node (PDSN) (not shown). Data interchange between various network elements, such as the radio network controllers 941-944 and a packet data server node, can be implemented using any number of protocols, for example, the Internet Protocol (IP), an asynchronous transfer mode (ATM) protocol, T1, E1, frame relay, or other protocols.

Each RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. The RNC is where the Node B's Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

WCDMA

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each remote station 923-927 uses an orthogonal variable spreading factor (OVSF) code. An OVSF code is an orthogonal code that facilitates uniquely identifying individual communication channels. In addition, micro diversity is supported using soft handover and closed loop power control is employed with the DCH.

Pseudorandom noise (PN) sequences are commonly used in CDMA systems for spreading transmitted data, including transmitted pilot signals. The time used to transmit a single value of the PN sequence is known as a chip, and the rate at which the chips vary is known as the chip rate. Inherent in the design of direct sequence CDMA systems is a receiver that aligns its PN sequences to those of the Node B 910, 911, 914. Some systems, such as those defined by the W-CDMA standard, differentiate base stations 910, 911, 914 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA Node Bs 910, 911, 914 operate asynchronously in relation to each other, so knowledge of the frame timing of one base station 910, 911, 914 does not translate into knowledge of the frame timing of any other Node B 910, 911, 914. In order to acquire this knowledge, W-CDMA systems uses synchronization channels and a cell searching technique.

HSPA

3GPP Release 5 and later supports High-Speed Downlink Packet Access (HSDPA). 3GPP Release 6 and later supports High-Speed Uplink Packet Access (HSUPA) HSDPA and HSUPA are sets of channels and procedures that enable high-speed packet data transmission on the downlink and uplink, respectively. Release 7 HSPA+ uses three enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 910, 911, 914 allows several user equipment devices 923-927 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 910, 911, 914 of an access network sends downlink payload data to user equipment devices 923-927 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 923-927 indicates to the device which codes within the code space will be used to send downlink payload data to the device, and the modulation that will be used for transmission of the downlink payload data.

With HSDPA operation, downlink transmissions to the user equipment devices 923-927 may be scheduled for different transmission time intervals using the 15 available HSDPA OVSF codes. For a given TTI, each user equipment device 923-927 may be using one or more of the 15 HSDPA codes, depending on the downlink bandwidth allocated to the device during the TTI.

MIMO

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the NxM paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal 923-927 may be any data device that communicates through a wireless channel or through a wired channel, for example using fiber optic or coaxial cables. An access terminal 923-927 may be any of a number of types of devices including but not limited to PC card, compact flash, external or internal modem, or wireless or wire line phone. The access terminal 923-927 is also known as user equipment (UE), a remote station, a mobile station or a subscriber station. Also, the UE 923-927 may be mobile or stationary.

User equipment 923-927 that has established an active traffic channel connection with one or more Node Bs 910, 911, 914 is called active user equipment 923-927, and is said to be in a traffic state. User equipment 923-927 that is in the process of establishing an active traffic channel connection with one or more Node Bs 910, 911, 914 is said to be in a connection setup state. The communication link through which the user equipment 923-927 sends signals to the Node B 910, 911, 914 is called an uplink. The communication link through which NodeB 910, 911, 914 sends signals to a user equipment 923-927 is called a downlink.

Figure 10:
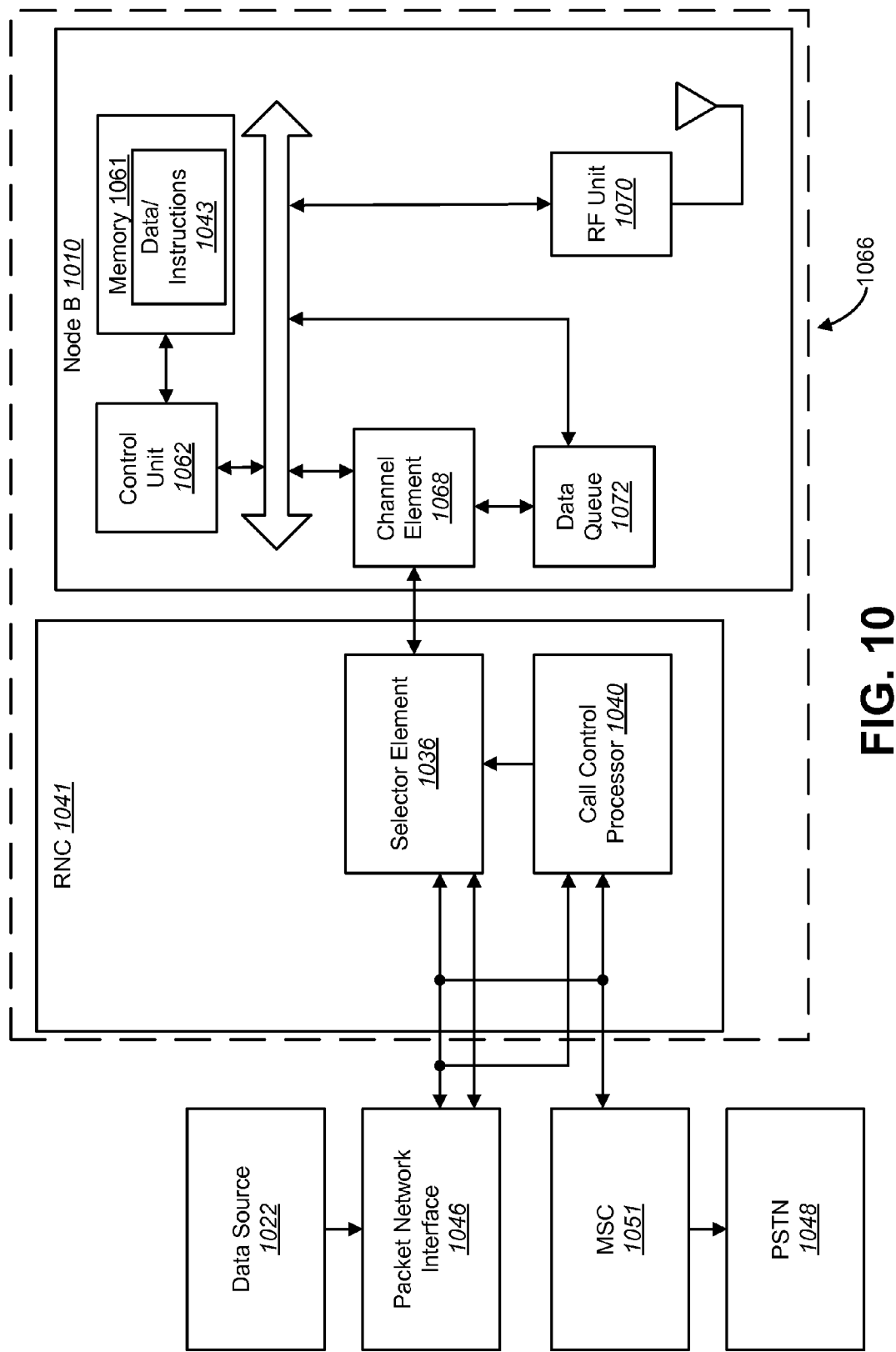
FIG. 10 is a block diagram illustrating a system where a Node B and a radio network controller (RNC) interface with a packet network interface.

FIG. 10 is a block diagram illustrating a system 1000 where a Node B 1010 and a radio network controller (RNC) 1041 interface with a packet network interface 1046. (Note in FIG. 10, only one Nodes B 1010 and only one RNC 1041 are shown for simplicity, although the system 1000 may be extended for multiple Node Bs 1010 and RNCs 1041). The Node B 1010 and radio network controller 1041 may be part of a radio network server (RNS) 1066, denoted by the dotted line surrounding one or more Node B 1010 and the radio network controller 1041. The associated quantity of data to be transmitted is retrieved from a data queue 1072 in the Node B 1010 and provided to a channel element 1068 for transmission to the user equipment 923-927 associated with the data queue 1072.

The radio network controller 1041 interfaces with the Public Switched Telephone Network (PSTN) 1048 through a mobile switching center 1051. Also, the radio network controller 1041 interfaces with Node Bs 1010 in the communication system 1000. In addition, the radio network controller 1041 interfaces with a Packet Network Interface 1046. The radio network controller 1041 coordinates the communication between the user equipment 923-927 in the communication system 1000 and other users connected to packet network interface 1046 and PSTN 1048. The PSTN 1048 interfaces with users through a standard telephone network (not shown in FIG. 10).

The radio network controller 1041 contains many selector elements 1036, although only one is shown in FIG. 10 for simplicity. Each selector element 1036 is assigned to control communication between one or more Node B's 1010 and one remote station 923-927. If the selector element 1036 has not been assigned to a given user equipment 923-927, a call control processor 1040 is informed of the desire to page the user equipment 923-927. The call control processor 1040 then directs the Node B 1010 to page the user equipment 923-927.

Data source 1022 contains a quantity of data, which is to be transmitted to a given user equipment 923-927. The data source 1022 provides the data to the packet network interface 1046. The packet network interface 1046 receives the data and routes the data to the selector element 1036. The selector element 1036 then transmits the data to the Node B 1010 in communication with the target user equipment 923-927. In one example, each Node B 1010 maintains a data queue 1072 which stores the data to be transmitted to the user equipment 923-927.

For each data packet, a channel element 1068 inserts the control fields. In one example, the channel element 1068 performs a cyclic redundancy check, CRC, encoding of the data packet and control fields and inserts a set of code tail bits. The data packet, control fields, CRC parity bits, and code tail bits comprise a formatted packet. The channel element 168 then encodes the formatted packet and interleaves (or reorders) the symbols within the encoded packet. The interleaved packet is covered with a Walsh code, and spread with the short PNI and PNQ codes. The spread data is provided to RF unit 1070 which quadrature modulates, filters, and amplifies the signal. The downlink signal is transmitted over the air through an antenna to the downlink.

At the user equipment 923-927, the downlink signal is received by an antenna and routed to a receiver. The receiver filters, amplifies, quadrature demodulates, and quantizes the signal. The digitized signal is provided to a demodulator (DEMOD) where the digitized signal is despread with the short PNI and PNQ codes and decovered with the Walsh cover. The demodulated data is provided to a decoder which performs the inverse of the signal processing functions done at the Node B 1010, specifically the de-interleaving, decoding, and CRC check functions. The decoded data is provided to a data sink.

Data and instructions 1043 may be stored in the memory 1061 in the Node B 1010. The instructions 1043 may include one or more programs, routines, sub-routines, functions, procedures, etc. The instructions 1043 may include a single computer-readable statement or many computer-readable statements. The instructions 1043 may be executable by a control unit 1062 to implement the methods disclosed in connection with the UE 923-927, Node B 1010 or other communication device. Executing the instructions 1043 may involve the use of the data 1043 that is stored in the memory 1061.

Figure 11:
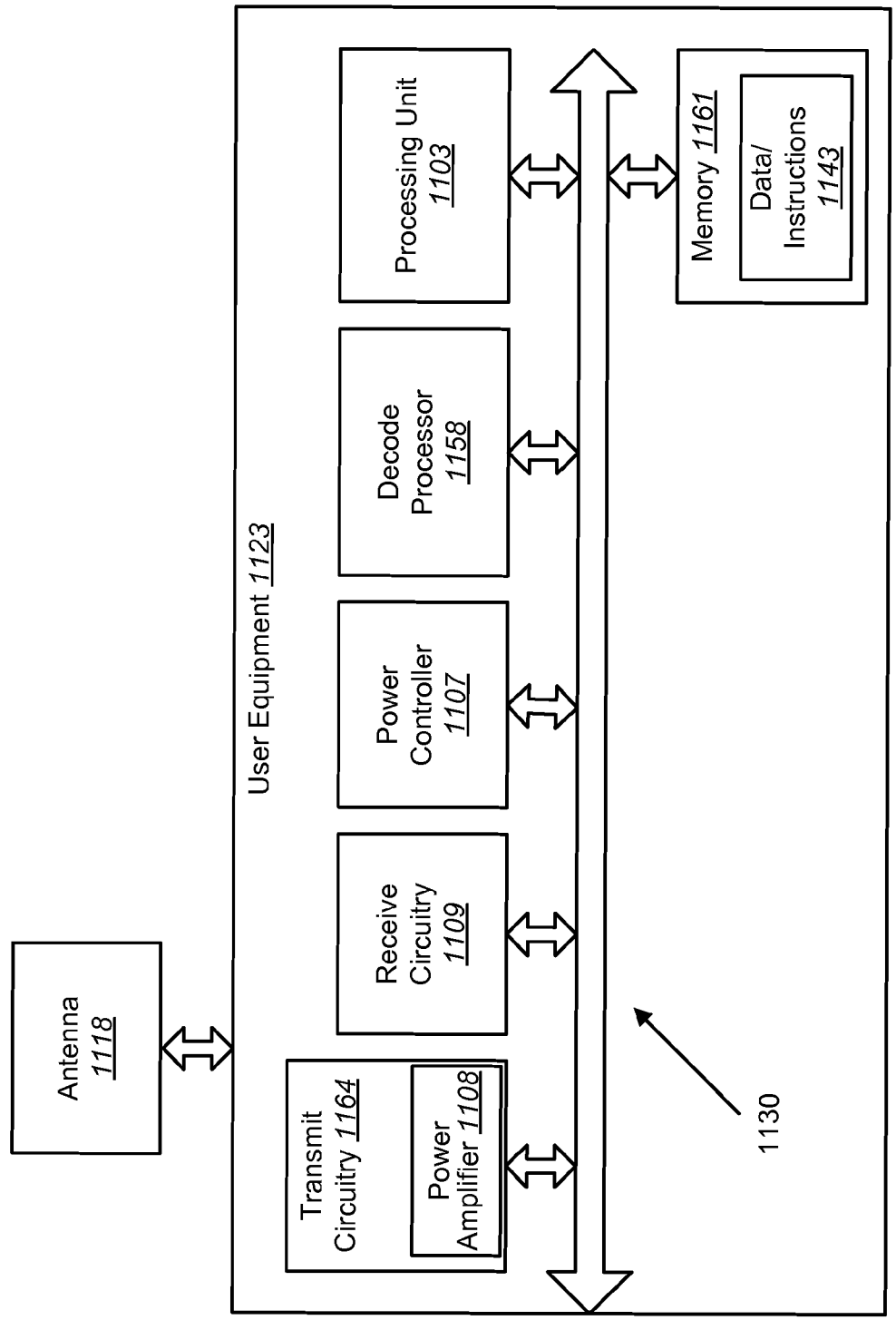
FIG. 11 is a block diagram illustrating user equipment (UE)

FIG. 11 is a block diagram illustrating user equipment (UE) 1123. The UE 1123 may include transmit circuitry 1164 (including power amplifier 1108), receive circuitry 109, power controller 1107, decode processor 1158, a processing unit 1103 for use in processing signals, and memory 1161. The transmit circuitry 1164 and the receive circuitry 1109 may allow transmission and reception of data, such as audio communications, between the UE 1123 and a remote location. The transmit circuitry 1164 and receive circuitry 1109 may be coupled to an antenna 1118.

The processing unit 1103 controls operation of the UE 1123. The processing unit 1103 may also be referred to as a CPU. Memory 1116, which may include both read-only memory (ROM) and random access memory (RAM), provides instructions and data to the processing unit 1103. A portion of the memory 1116 may also include non-volatile random access memory (NVRAM).

The various components of the UE 1123 are coupled together by a bus system 1130 which may include a power bus, a control signal bus, and a status signal bus in addition to a data bus. For the sake of clarity, the various busses are illustrated in FIG. 11 as the bus system 1130.

The steps of the methods discussed may also be stored as instructions 1143, e.g., in the form of software or firmware (instructions) located in the memory 1161. These instructions 1143 may be executed by the processing unit 1103.

Figure 12:
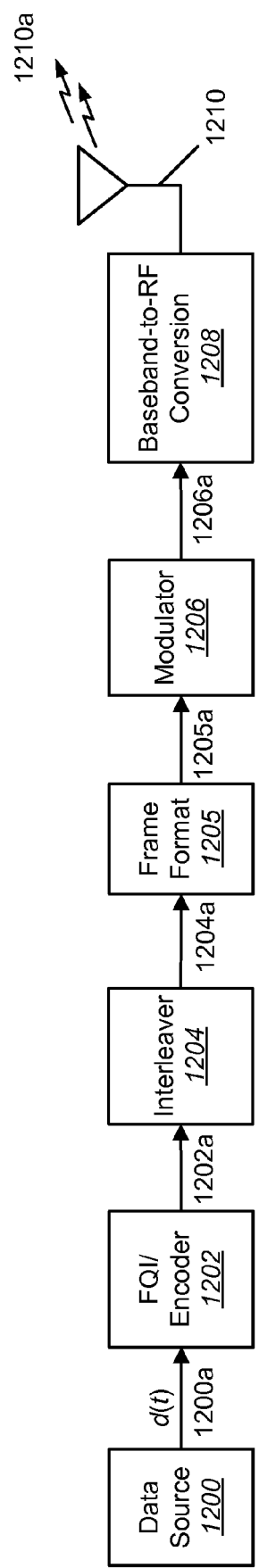
FIG. 12 illustrates an example of a transmitter structure and/or process, which may be implemented at user equipment or a Node B.

FIG. 12 illustrates an example of a transmitter structure and/or process, which may be implemented at user equipment 1123 or a Node B 1010. The functions and components shown in FIG. 12 may be implemented by software, hardware, or a combination of software and hardware. Although not shown, other functions may also be performed in addition to or instead of the functions illustrated in FIG. 12.

In FIG. 12, a data source 1200 provides data d(t) or 1200a to an FQI/encoder 1202. The FQI/encoder 1202 may append a frame quality indicator (FQI) such as a cyclic redundancy check (CRC) to the data d(t). The FQI/encoder 1202 may further encode the data and FQI using one or more coding schemes to provide encoded symbols 1202a. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 1204 interleaves the encoded data symbols 1202a in time to combat fading, and generates symbols 1204a. The interleaved symbols of signal 1204a may be mapped by a frame format block 1205 to a pre-defined frame format to produce a frame 1205a. In an example, a frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 1204a are segmented into a plurality S of sub-segments making up a frame 1205a.

A frame format may further specify the inclusion of, e.g., control symbols (not shown) along with the interleaved symbols 1204a. Such control symbols may include, e.g., power control symbols, frame format information symbols, etc.

A modulator 1206 modulates the frame 1205a to generate modulated data 1206a. Examples of modulation techniques include binary phase shift keying (BPSK) and quadrature phase shift keying (QPSK). The modulator 1206 may also repeat a sequence of modulated data.

A baseband-to-radio-frequency (RF) conversion block 1208 may convert the modulated signal 1206a to RF signals for transmission via an antenna 1210 as signal 1210a over a wireless communication link to one or more Node B station receivers.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 3, 7 and 12 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for sending an uplink order to active set base stations, comprising:
    determining, by a processor, a new mode of operation for a wireless communication device;
    sending a transmission on an uplink control channel to active set base stations that indicates the new mode;
    transitioning to the new mode of operation;
    wherein the uplink control channel is an Enhanced Dedicated Physical Control Channel (E-DPCCH);
    wherein the transmission comprises an illegal value for a packet size parameter that indicates that the transmission is an uplink order;
    wherein the illegal value is a reserved Enhanced Dedicated Channel (E-DCH) Transport Format Combination Indicator (E-TFCI) codeword that chosen based on which E-TFCI table with which the wireless communication device is configured;
    wherein the transitioning to the new mode comprises switching to a coverage extension (CE) mode, comprising: transmitting using eight hybrid automatic repeat request (HARQ) processes each with a two millisecond duration; and
    at a transition boundary:
    transmitting using four super HARQ processes each with a ten millisecond duration.

2. The method of claim 1, further comprising sending the transmission one or more subsequent times.

3. The method of claim 2, wherein the sending the transmission one or more subsequent times comprises sending the transmission until an acknowledgment is received from every base station in the active set of the wireless communication device.

4. The method of claim 2, wherein the sending the transmission one or more subsequent times comprises sending the transmission a fixed number of subsequent transmissions.

5. The method of claim 1, wherein the determining comprises averaging an available headroom metric over a period of time and comparing the average to a predetermined threshold to determine if the new mode of operation is needed.

6. An apparatus for sending an uplink order to active set base stations, comprising:
  a processor;
  memory in electronic communication with the processor;
  instructions stored in the memory, the instructions being executable by the processor to:
  determine a new mode of operation for a wireless communication device;
  send a transmission on an uplink control channel to active set base stations that indicates the new mode;
  transition to the new mode of operation;
  wherein the uplink control channel is an Enhanced Dedicated Physical Control Channel (E-DPCCH);
  wherein the transmission comprises an illegal value for a packet size parameter that indicates that the transmission is an uplink order;
  wherein the illegal value is a reserved Enhanced Dedicated Channel (E-DCH) Transport Format Combination Indicator (E-TFCI) codeword that chosen based on which E-TFCI table with which the wireless communication device is configured;
  wherein the instructions executable to transition to the new mode comprise instructions executable to switch to a coverage extension (CE) mode, comprising instructions executable to: transmitting using eight hybrid automatic repeat request (HARQ) processes each with a two millisecond duration; and
  at a transition boundary:
  transmitting using four super HARQ processes each with a ten millisecond duration.

7. The apparatus of claim 6, further comprising instructions executable to send the transmission one or more subsequent times.

8. The apparatus of claim 6, wherein the instructions executable to send the transmission one or more subsequent times comprises instructions executable to send the transmission until an acknowledgment is received from every base station in the active set of the wireless communication device.

9. The apparatus of claim 6, wherein the instructions executable to send the transmission one or more subsequent times comprises instructions executable to send the transmission a fixed number of subsequent transmissions.

10. The apparatus of claim 6, wherein the instructions executable to determine comprise instructions executable to average an available headroom metric over a period of time and comparing the average to a predetermined threshold to determine if the new mode of operation is needed.

11. An apparatus for sending an uplink order to active set base stations, comprising:
  means for determining a new mode of operation for a wireless communication device;
  means for sending a transmission on an uplink control channel to active set base stations that indicates the new mode;
  means for transitioning to the new mode of operation;
  wherein the uplink control channel is an Enhanced Dedicated Physical Control Channel (E-DPCCH);
  wherein the transmission comprises an illegal value for a packet size parameter that indicates that the transmission is an uplink order;
  wherein the illegal value is a reserved Enhanced Dedicated Channel (E-DCH) Transport Format Combination Indicator (E-TFCI) codeword that chosen based on which E-TFCI table with which the wireless communication device is configured;
  wherein the transitioning to the new mode comprises to switch to a coverage extension (CE) mode, comprising instructions executable to: transmitting using eight hybrid automatic repeat request (HARQ) processes each with a two millisecond duration; and
  at a transition boundary:
  transmitting using four super HARQ processes each with a ten millisecond duration.

12. The apparatus of claim 11, further comprising means for sending the transmission one or more subsequent times.

13. The apparatus of claim 12, wherein the means for sending the transmission one or more subsequent times comprise means for sending the transmission until an acknowledgment is received from every base station in the active set of the wireless communication device.

14. The apparatus of claim 12, wherein the means for sending the transmission one or more subsequent times comprise means for sending the transmission a fixed number of subsequent transmissions.

15. A non-transitory computer-readable medium for sending an uplink order to active set base stations, the non-transitory computer-readable medium comprising a computer-program product having instructions thereon, the instructions comprising:
  code for causing a wireless communication device to determine a new mode of operation for a wireless communication device;
  code for causing the wireless communication device to send a transmission on an uplink control channel to active set base stations that indicates the new mode;
  code for causing the wireless communication device to transition to the new mode of operation;
  wherein the uplink control channel is an Enhanced Dedicated Physical Control Channel (E-DPCCH);
  wherein the transmission comprises an illegal value for a packet size parameter that indicates that the transmission is an uplink order;
  wherein the illegal value is a reserved Enhanced Dedicated Channel (E-DCH) Transport Format Combination Indicator (E-TFCI) codeword that chosen based on which E-TFCI table with which the wireless communication device is configured;
  wherein the transition to the new mode comprises to switch to a coverage extension (CE) mode, comprising:
  transmitting using eight hybrid automatic repeat request (HARQ) processes each with a two millisecond duration; and
  at a transition boundary:
  transmitting using four super HARQ processes each with a ten millisecond duration.

16. The non-transitory computer-readable medium of claim 15, further comprising code for sending the transmission one or more subsequent times.

17. The non-transitory computer-readable medium of claim 16, wherein the code for sending the transmission one or more subsequent times comprises code for sending the transmission a fixed number of subsequent transmissions.

18. The non-transitory computer-readable medium of claim 15, wherein the code for sending the transmission one or more subsequent times comprises code for sending the transmission until an acknowledgment is received from every base station in the active set of the wireless communication device.

* * * * *